United States Patent [19]

Sato et al.

[11] 4,103,113

[45] Jul. 25, 1978

[54] ATTENDANT CONSOLE CONTROL SYSTEM

[75] Inventors: Kazuhiro Sato, Yokohama; Nobuyuki Yasoshima, Zama; Toru Masuda, Fujisawa, all of Japan; Makoto Fujisawa, Montebello, Calif.; Yasuo Satake, Kawasaki, Japan

[73] Assignee: Fujitsu Limited, Kawasaki, Japan

[21] Appl. No.: 788,972

[22] Filed: Apr. 19, 1977

[30] Foreign Application Priority Data

Apr. 24, 1976 [JP] Japan .................................. 51-46900

[51] Int. Cl.$^2$ ............................................ H04M 3/22
[52] U.S. Cl. ............................. 179/27 CA; 179/27 FC
[58] Field of Search ............ 179/27 FF, 27 CA, 81 C, 179/27 FC

[56] References Cited

U.S. PATENT DOCUMENTS

| | | | |
|---|---|---|---|
| 3,101,393 | 8/1963 | Desnoes et al. | 179/27 CA |
| 3,322,907 | 5/1967 | Browne et al. | 179/27 CA X |
| 3,928,732 | 12/1975 | Simon et al. | 179/27 FC X |

*Primary Examiner*—William C. Cooper
*Attorney, Agent, or Firm*—Staas & Halsey

[57] ABSTRACT

Key information from an attendant console is transferred to a telephone exchange in a bit serial manner, and line status information from the telephone exchange is also transferred in a bit serial manner and in a time-shared manner. At the request of the attendant console, the line status information is transferred from the telephone exchange to the attendant console in a bit serial manner, and subjected to serial-parallel conversion to obtain parallel signals for driving lamp indicator portions so as to provide an indication of the line status information. The number of signal lines connected to the attendant console is markedly reduced and, in the case of telephone number modification or the like, proper steps can be taken immediately.

28 Claims, 12 Drawing Figures

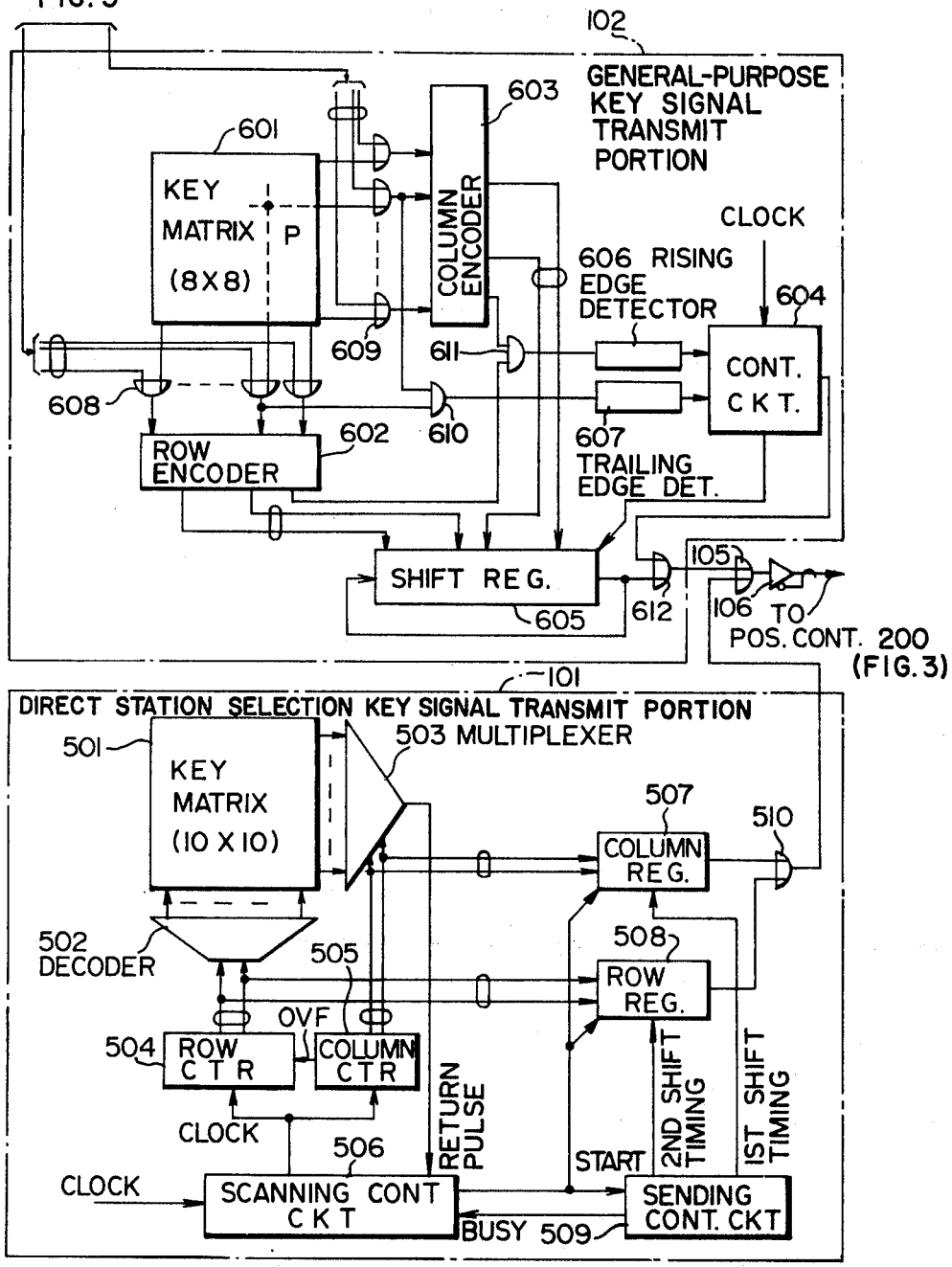

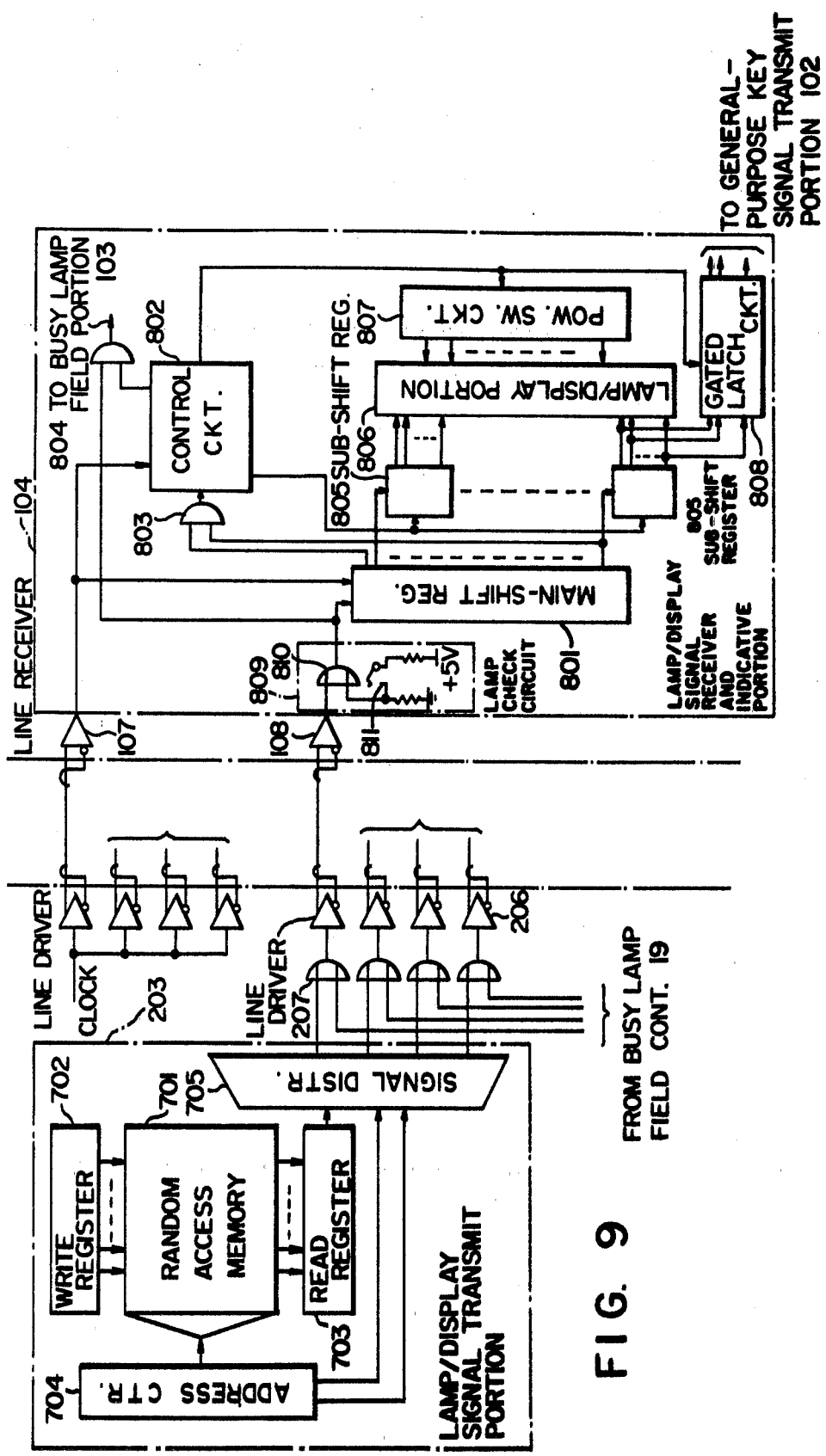
F I G. 9

ATTENDANT CONSOLE CONTROL SYSTEM

BACKGROUND OF THE INVENTION

1. Field of the Invention

This invention relates to an attendant console control system, and more particularly to an attendant console control system in which the key information input from an attendant console is transferred to a telephon exchange in a bit serial manner, and the line status information is periodically transferred from the telephone exchange to the attendant console in a bit serial manner so as to indicate the line status on the attendant console.

2. Description of the Prior Art

The operative state information of a telephone exchange is, in general, transferred to an attendant console for visual indication, as by lamps, and when a key operation takes place in the attendant console, the key information is transferred to the telephone exchange. It is desired to strictly limit such transferred information to only that which is necessary and sufficient so as to obtain an economical construction. With the improvement of performance and capability of exchange control equipment, exchange service becomes diversified. Since the exchange services is not fixed but differes with the user's requirements, it is desirable, from the standpoint of the operator, that the attendant console be easy to operate. With diversification of the exchange service, the amount of information to be transferred increases and the content of information differs with particular requirements. Accordingly, conventional systems are limited in flexibility, economy, ease of operation and maintenance.

FIG. 1 is a block diagram explanatory of the conventional system, in which subscribers' telephones 1a to 1n are connected to a network 3 through line circuits 2a to 2n, and the network 3 is connected to a distant office through a trunk 4. Attendant consoles 5a and 5b have connected to their display portions C-lines of the line circuits 2a to 2n. The key information by the key operation of the attendant consoles 5a and 5b is transferred to a common control equipment 8 through position controllers (pos. cont.) 7a and 7b, respectively, and the operative state information of the exchange is transferred from the common control equipment 8 to the attendant consoles 5a and 5b, also through the position controllers 7a and 7b, respectively.

The line status information in the attendant consoles 5a and 5b is displayed depending upon whether or not the C-lines of the line circuits 2a to 2n are grounded. With an increase in the number of C-lines connected to the display portion of the attendant console, the wiring becomes complicated and the construction of the system becomes very uneconomical. Further, in the case of changing the subscriber's telephone number, wiring modification and the like are required, and it is seen that the conventional system lacks flexibility.

SUMMARY OF THE INVENTION

One object of this invention is to provide an attendant console control system which enables information transfer between an attendant console and an exchange by means of a simple structure.

Another object of this invention is to provide an attendant console control system in which line status information is transferred from an exchange to an attendant console in a time-shared manner to provide an indication of the line status.

Another object of this invention is to provide an attendant console control system in which key information from an attendant console is transferred to an exchange in a timeshared manner.

Still another object of this invention is to provide an attendant console control system which enables easy testing of the display portion of the attendant console.

Briefly stated, in the present invention, the key information entered by key operation of the attendant console is transferred to a common control equipment in a bit serial manner, and subscribers' telephone numbers and the line status information corresponding to each of the telephone numbers are previously stored in a memory. When the entered key information is line status display requesting information, the line status information contained in the key information, corresponding to the telephone numer, is read out, and arranged in the numerical order of lower-order digits, and the line status information thus arranged in the numerical order is transferred to the attendant console in the bit serial manner.

Other objects and effects of this invention will become apparent from the following description taken in conjunction with the accompanying drawings.

BRIEF DESCRIPTION OF THE DRAWINGS

FIG. 7 is a block diagram illustrating a general-purpose key signal transmit portion and a direct station selection key signal transmit portion in the embodiment of FIG. 2;

FIG. 9 is a block diagram showing the principal parts of a lamp/display signal transmit portion of the position controller and a lamp/display signal receiver and indicative portion of the attendant console in the embodiment of FIG. 2.

DESCRIPTION OF THE PREFERRED EMBODIMENTS

Figure 1:
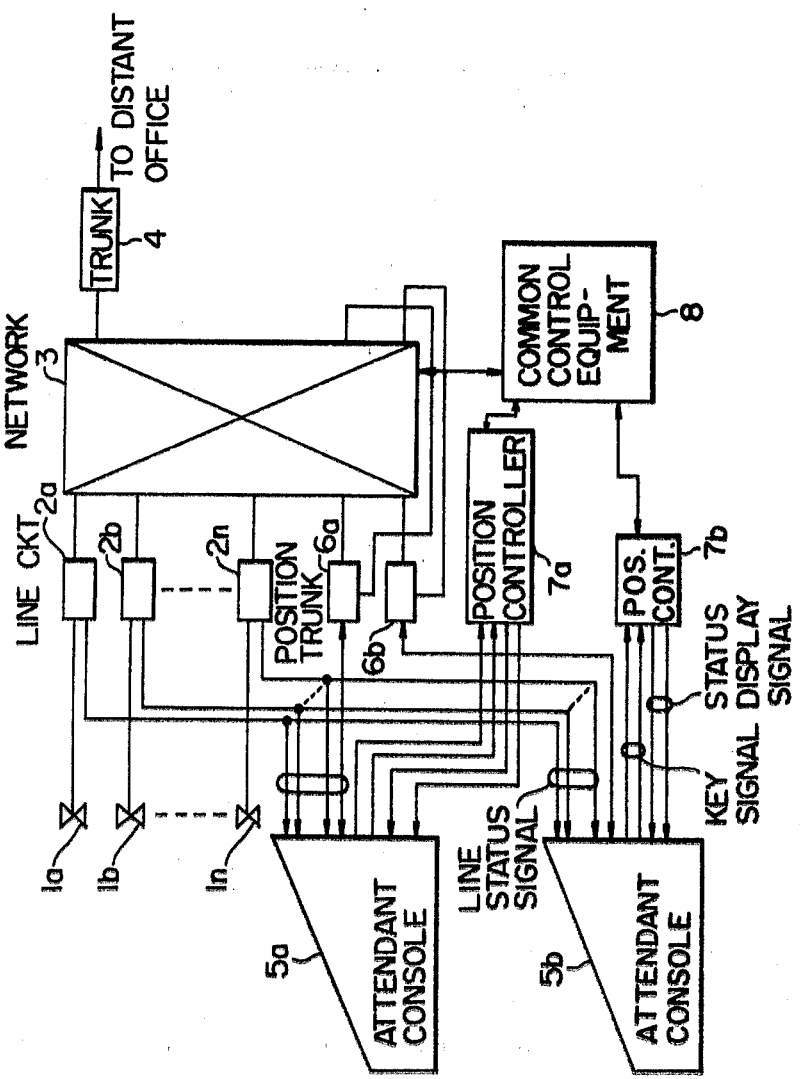
FIG. 1 is a block diagram explanatory of a conventional attendant console control system.
Figure 2:
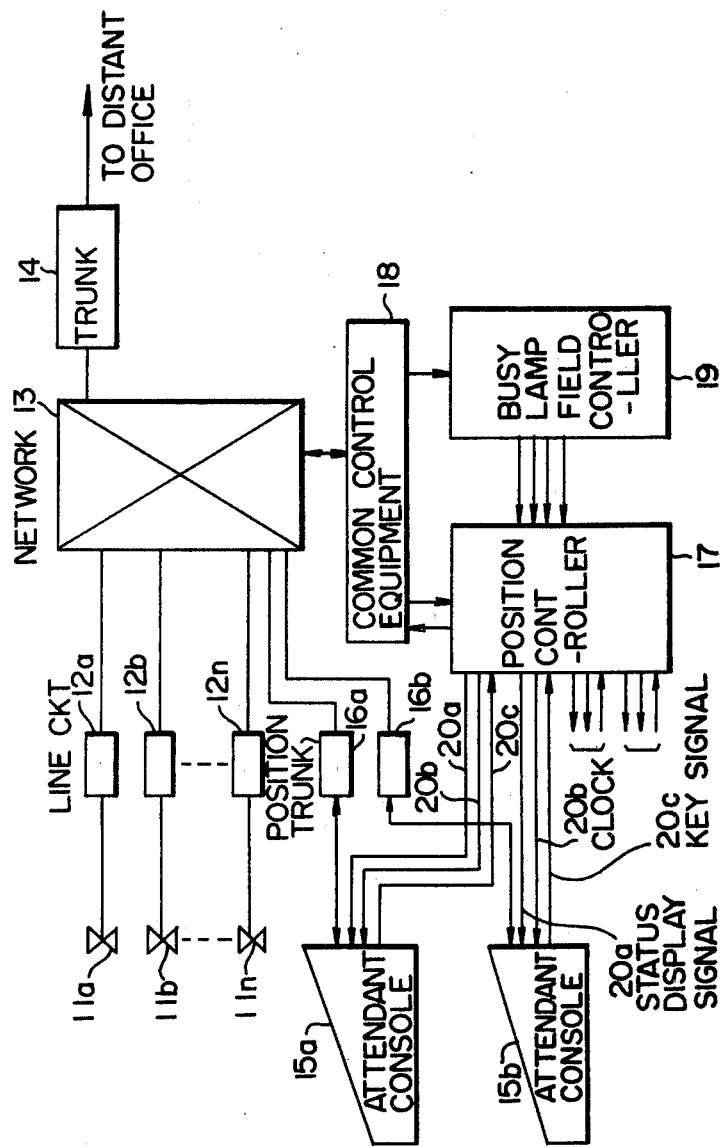
FIG. 2 is a block diagram explanatory of an embodiment of an attendant console control system of this invention.

FIG. 2 shows in block form an embodiment of this invention, in which subscriber telephones 11a to 11n are connected to a network 13 through line circuits 12a to 12n, and the network 13 is connected to a distanct office through a trunk 14. Attendant consoles 15a and 15b are connected to the network 13 through position trunks 16a and 16b, respectively, further, the attendant consoles 15a and 15b are each connected to a position controller 17 through a status display signal line 20a, a clock signal line 20b, and a key signal line 20c. The position controller 17 is connected to common control equipment 18 and to a busy lamp field controller 19. That is, no C-line is connected to the attendant consoles 15a and 15b from the line circuits 12a to 12n, and key information and line status information are transferred in the bit serial manner, so that the attendant consoles 15a and 15b and the position controller 17 are interconnected through the status display signal lines 20a, the clock signal lines 20b, and the key signal lines 20c. This remarkably simplifies wiring as compared with that in the prior art. The present embodiment is shown in connection with the case where four attendant consoles are provided.

Figure 3:
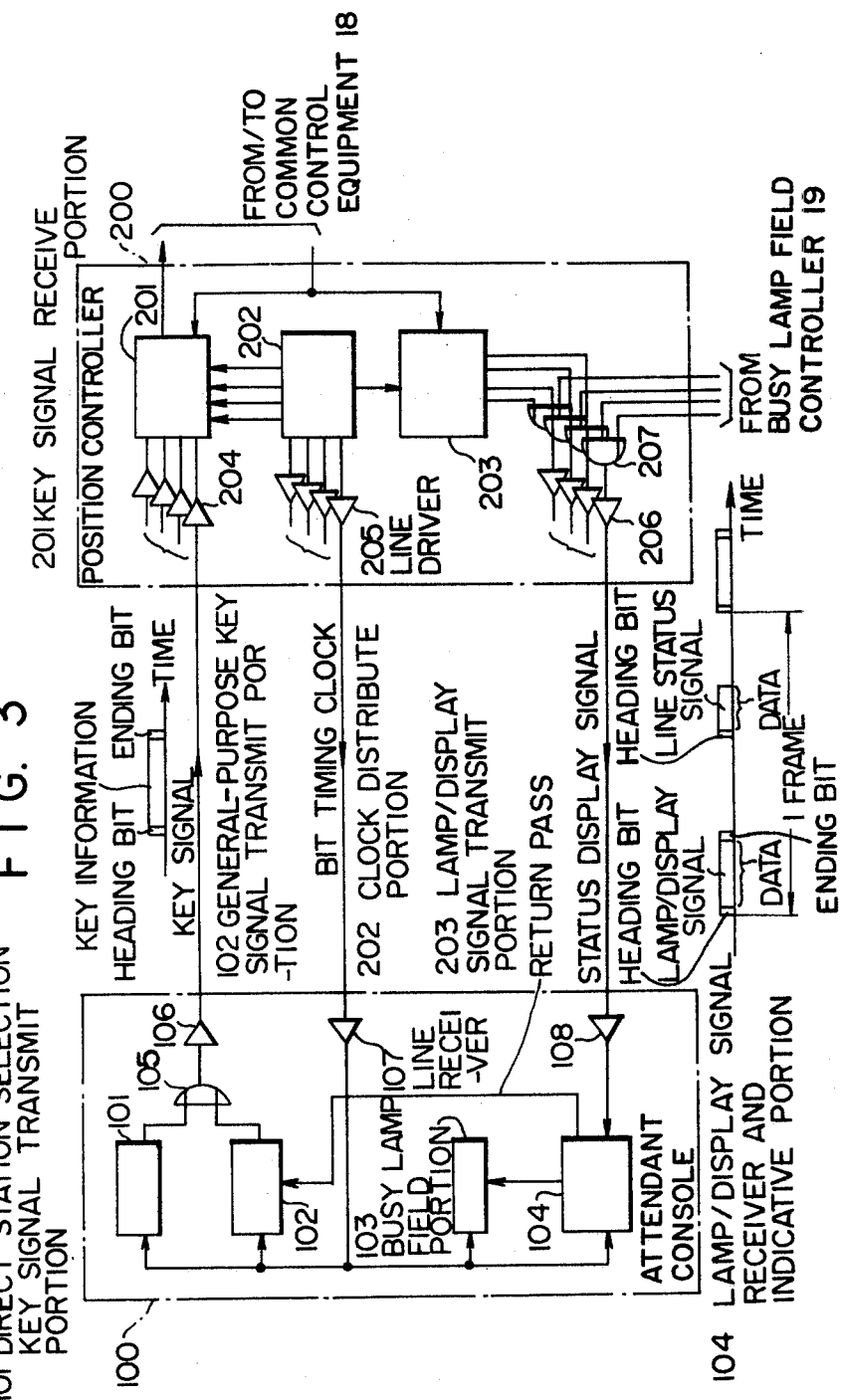
FIG. 3 is a block diagram showing the relation between a position controller and the attendant console in the embodiment of FIG. 2.

FIG. 3 is a block diagram showing the relation between the attendant console and the position controller. An attendant console 100 comprises a direct station selection key signal transmit portion 101, a general-purpose key signal transmit portion 102, a busy lamp field portion 103, a lamp/display signal receiver and indicative portion 104, an OR gate 105, a line driver 106, and line receivers 107 and 108. A position controller 200 comprises a key signal receiver portion 201, a a clock distribute portion 202, a lamp/display signal transmit portion 203, line receivers 204, line drivers 205 and 206, and OR gates 207.

A clock signal from the clock distribute portion 202 is supplied to each attendant console, and a key signal from the direction station selection key signal transmit portion 101 or the general-purpose key signal transmit portion 102 is augmented with a heading bit and an ending bit, and transferred to the key signal receiver portion 201 of the position controller 200 in the bit serial manner, and thence the key information is transferred to the common control equipment 18 (FIG. 2).

The line status display information from the busy lamp field controller 19 is transferred through the OR gate 207 (FIG. 3) to the lamp/display signal receiver and indicative portion 104 of the attendant console 100 in the bit serial manner. In this case, the line status display information is transferred in a time-shared manner during one frame (see FIG. 3) with a lamp/display signal from the lamp/display signal transmit portion 203, and the former being augmented with a heading bit, and the latter with a heading bit and an ending bit.

Figure 4:
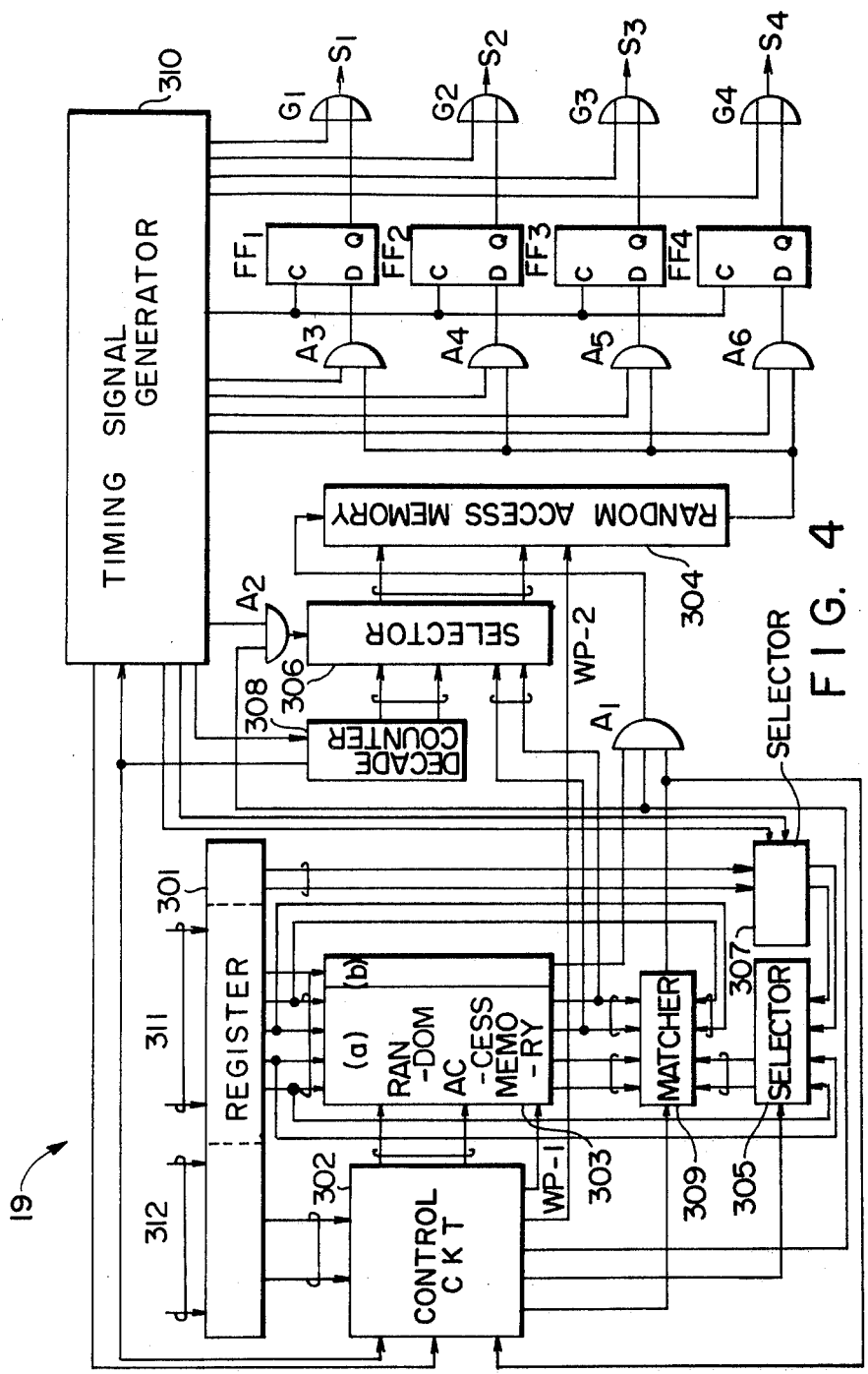
FIG. 4 is a block diagram illustrating a busy lamp field controller in the embodiment of FIG. 2.

FIG. 4 shows in block form the busy lamp field controller 19, which comprises a register 301, a control circuit 302, random access memories 303 and 304, selectors 305 to 307, a two-digit decade counter 308, a matcher 309, a timing signal generator 310. data buses 311, address buses 312, AND gates A1 to A6, OR gates G1 to G4, and flip-flops FF1 to FF4, and in which display signals S1 to S4 are derived from the OR gates G1 to G4.

An initial setting is achieved by registering all subscribers' telephone numbers in the memory 303. For example, a 4-digit telephone number is transferred in the form of a BCD code from the map or the like of the common control equipment of an exchange to the register 301 through the data buses 311, and the control circuit 302 applies a write pulse WP-1 to the memory 303 so as to write therein the content of the register 301. The memory 303 has a 16-bit area (a) for writing therein the aforesaid 4-digit telephone number of the BCD code and, for example, a 1-bit line status bit area (b) corresponding to the telephone number. Accordingly, a telephone number write address can be written regardless of whether the telephone number is large or small.

Disregarding the troublesome nature of the modification of the telephone number to some extent, a read-only memory (ROM) or a programmable read-only memory (P-ROM) can be used as the area (a). This provides the advantage of further simplified construction.

After initial setting, upon detection of status transition by occurrence of an on-hook or off-hook condition, the common control equipment sets the status signal and the telephone number in the register 301. This telephone number is retrieved by the matcher 309 from the telephone numbers registered in the memory 303 under the control of the control circuit 302, and the area (b) corresponding to the retrieved telephone number is updated. Accordingly, the content of the memory 303 is always indicative of the latest line status.

With the present invention, all the line status data can be displayed in accordance with the content of the memory 303, but it is sufficient, in general, to display the line status data at the rate of about one hundred lines, so that, in the present example, two lower-order digits of the telephone numbers are arranged in numerical order to provide a display of the line status data at the rate of 100 lines.

For instance, when the console attendant dials two higher-order numerals of the telephone number of a subscriber upon reception of a call for him, the two higher-order digits of the telephone number are set by the common control equipment in the register 301 (which has areas for setting the two higher-order digits, each area corresponding to one attendant console, though not shown). The selector 305 is controlled by the control circuit 302 and the timing signal generator 310 so that it applies the two higher-order digits set in the register 301 to the matcher 309 for matching them with two higher-order digits of the telephone number registered in the memory 303. For example, in the case of calling a line of telephone number "1215", matching of the two higher-order digits "12" is achieved and the area (b) is read out for "1200" to "1299" and, at the same time, the selector 306 accesses the memory 304 based on the two lower-order digits "00" to "99". At this time, the control circuit 302 produces a write pulse WP-2 to write the content read out from the area (b) in the memory 304. That is, when the output signals from the control circuit 304 and the matcher 309 are both "1", the content of the area (b) is written in the memory 304 through the AND gate A1, which memory is accessed with two lower-order digits as address information. Accordingly, the memory 304 stores the line status information in the numerical order of two lower-order digits of telephone numbers. Since it is considered that there will be requests for display of the line status of different levels of telephone numbers from a plurality of console attendants, such rearrangement of the telephone numbers as described above is carried out in a time-shared manner, with the registers respectively corresponding to the attendant consoles selected by the selector 307.

On the other hand, the memory 304 is read out in the following manner:- The clock signals from the timing signal generator 310 are counted by the two-digit decade counter 308, the output of which is applied as address information through the selector 306 to the memory 304 to periodically access it in the intervals between the aforesaid write times. Accordingly, the line status information is read out from the memory 304 in numerical order. Switching of the operation of such a selector 306 is performed in response to the output from the AND gate A2.

From the memory 304, the line status information is repeatedly read out and applied to the AND gates A3 to A6, respectively, and in accordance with the signal from the timing signal generator 310, the line status information from the memory 304 is applied to any one of the flip-flops FF1 to FF4. For instance, if the request for display from the operator of the indicative portion of a first attendant console is for a telephone number in the 1500s, read-out information corresponding to 100 lines of telephone numbers from 1500 to 1599 is applied to the flip-flop FF1 in the bit serial manner. If the request for display from the operator of the indicative portion of a second console is for a telephone number in the 2200s, read-out information of 100 lines of telephone numbers from 2200 to 2299 is similarly applied to the flip-flop FF2. In a likewise manner, read-out information of 100 lines complying with the request for display from the operator of each of the other consoles is also applied to each of the flip-flops FF3 and FF4.

The flip-flops FF1 to FF4 are D-type flip-flops, reference character C indicating a clock signal input terminal and D a data input terminal. their Q-terminal outputs are respectively applied to the OR gates G1 to G4, to which are applied heading bits from the timing signal generator 310.

Figure 5:
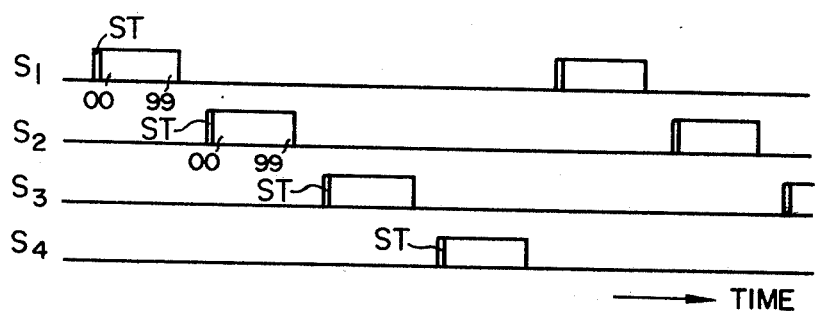
FIG. 5 is a time chart for sending of line status information.

Accordingly, display information S1 to S4 is headed by a heading bit and composed of the line status information arranged in the order of the two lower-order digits 00 to 99 of the telephone numbers, as shown in FIG. 5, and is repeatedly sent out to each indicative portion in the time-sharing manner.

Figure 6:
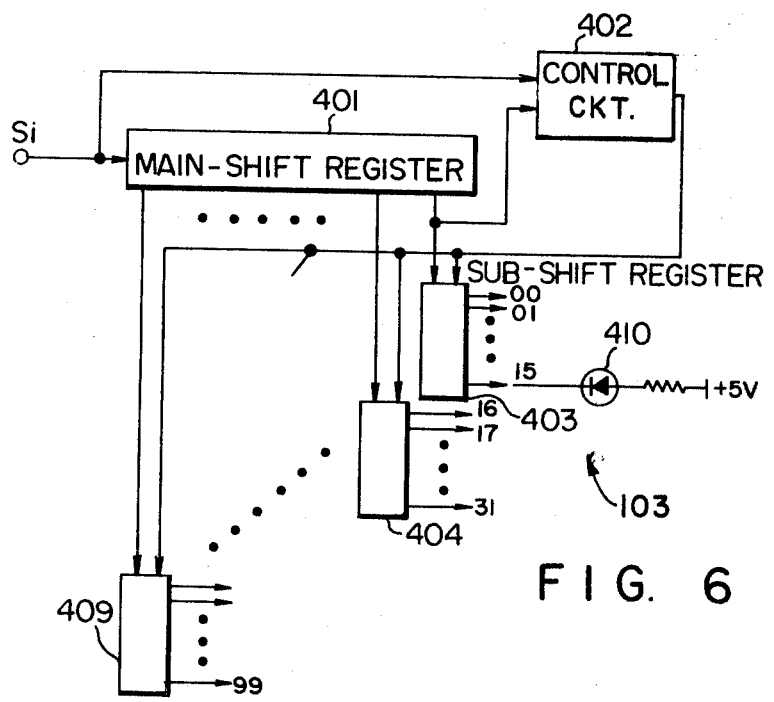
FIG. 6 is a block diagram showing the principal part of the busy lamp field portion in the embodiment of FIG. 3.

FIG. 6 illustrates in block form the principal parts of the busy lamp field portion 103 of FIG. 3. The line status information Si ($i = 1, 2, 3, 4$) is sequentially set in a main-shift register 401. The heading bit ST is detected by a control circuit 402 and, that is, the appearance of this heading bit ST at the last tap of the main-shift register 401 is detected by the control circuit 402. Taps are provided from the main-shift register 401 every 16 bits, and are connected to sub-shift registers 403 to 409, respectively.

When the control circuit 402 detects the appearance of the heading bit ST at the tap connected to the shift register 403, 16 shift clock pulses are applied from the control circuit 402 to the shift register 403 to 409, causing them to perform a 16-bit shift from the main-shift register 401. Thus, the outputs from the shift registers 403 to 409, corresponding to each bit, provide the line status information corresponding to the two lower-order digits of telephone numbers.

In the case of providing a BLF (busy lamp field) display of, for example, the aforesaid telephone number "1215", the line status of each of the lines from "1200" to "1299" is indicated by luminescent diodes such as 410. In this case, if the line "15" is indicated to be busy and if the line "16" is indicated to be idle, it is decided that the line "1215" is busy and that the line "1216" is idle.

In this display process, during the shift operation of the shift registers 403 to 409, indicator elements such as the luminescent diodes 410 go on and off in response to the line status information. By sufficiently increasing the shift speed, flashing of the indicator elements can be effected in a very short shifting time, and a predetermined indication can be provided. Accordingly, the flashing will neither give the operator an unpleasant feeling nor lead him to misinterpretation of the indication. In this manner, the line status information serially transmitted is converted by the shift registers 403 to 409 into a parallel form, so that there is no need of repeatedly applying the same line status information to the same indicative portion. Even where a plurality of indicative portions are provided, since such a control portion as shown in FIG. 4 (which is the line status information sending portion) is shared, the construction can be made economical.

The above example has been described in connection with the case where the line status is indicated to be busy or idle. But if information such as the classes of subscribers, their presence or absence, etc. are stored in the memory 303 corresponding to the respective telephone numbers, such information can be displayed by the abovesaid operation. Further, the numbers of higher- and lower-order digits are selected in accordance with the number of digits of the telephone number and the number of indicator elements of the indicative portion, so that a desired number of digits can be selected other than the two higher-order digits and two lower-order digits used in the above example.

In the busy lamp field portion 103, the indicator elements such as luminescent diodes 410 or the like can be driven directly by the parallel outputs converted by the shift registers 403 to 409, but is is also possible to control the indicator elements by relays, drivers or the like for flashing. Moreover, the number of indicative portions can be increased, of course, and this does not introduce complexity in the construction.

As described above, only by adding the construction of FIG. 4 to the exchange and the construction of FIG. 6 to the attendant console, can the line status be indicated in a form which is easily recognized. For example, where the arrangement of FIG. 6 is formed with C-MOS and TTL, it can be realized with 21 integrated circuits and can be loaded on one or several printed circuit boards, so that the required space therefor is very small. Further, the busy lamp field controller 19 (FIG. 2) is also almost shared by a plurality of indicative portions 104 (FIG. 3), and hence is of economical construction. And since the higher-order digits are known to the operator requesting the line state indication, indication is made easy by the indication of the lower-order digits.

FIG. 7 illustrates in block form the direct station selection key signal transmit portion 101 and the general-purpose key signal transmit portion 102. The direct station selection key signal transmit portion 101 comprises a direct station selection key matrix 501, a decoder 502, a multiplexer 503, a row counter 504, a column counter 505, a scanning control circuit 506, a column register 507, a row register 508, a sending control circuit 509, and an OR gate 510. The general-purpose key signal transmit portion 102 comprises a key matrix 601, a row encoder 602, a column encoder 603, a control circuit 604, a shift register 605, a rising edge detector circuit 606, a trailing edge detector circuit 607, OR gates 608, 609 and 612, and AND gates 610 and 611.

The key matrix 601 is, for instance, an ($8\times8$) key matrix, and when a key P is turned on, its position is converted by the row and column encoders 602 and 603 into a binary number which is indicative of the position of the point P with respect to X- and Y-coordinates. At the same time, by the outputs from the row and column encoders 602 and 603, the output "1" is derived from the AND gate 611 and a signal indicating detection of the moment of rising from "0" to "1" is provided by the rising edge detector circuit 606 and applied to the control circuit 604.

Upon application of the rising detection signal, the control circuit 604 applies a set instruction signal to the shift register 605 to set therein the encoded outputs from the row and column encoders 602 and 603 and, at the same time, by a transfer instruction signal from the control circuit 604, the contents of the shift register 605 are transferred in the bit serial manner to the position controller 200 (FIG. 3) through the OR gates 612 and 105, and the line driver 106. In this case, a heading bit and an ending bit are respectively added by the control circuit 604 to the head and tail of the key information, and the output contents of the row and column encoders 602 and 603 also fed back to the shift register 605 and held therein.

When the key P is turned off, the output from the AND gate 610, shown to correspond to the key P, is altered from "1" to "0" and its trailing edge is detected by the trailing edge detector circuit 607. Based upon the trailing edge detecting signal, the control circuit 604 sends a transfer instruction signal to the shift register 605 to transfer its contents in the bit serial manner. Also in this case, heading and ending bits are added by the control circuit to the key information.

For indicating whether the key P is in the on or off state, a special bit may be added to the key information, or the ending bit may also be ued; for instance, its on and off state are indicated by "1" and "0", respectively.

Figure 8A:
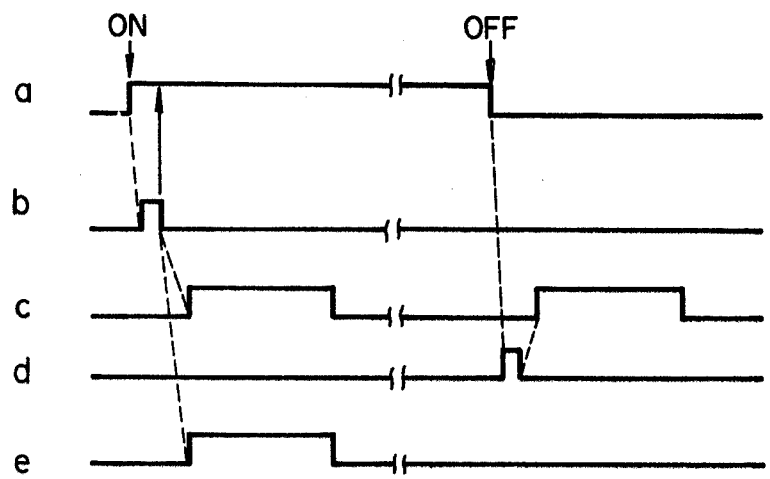
FIG. 8A and 8B are time charts for sending of a general-purpose key signal and a direct station selection key signal.

FIG. 8A is a time chart explanatory of the operation of the abovesaid general-purpose key signal transmit portion 102, $a$ showing the on and off states of the key and $b$ the rising edge detecting signal. Upon obtaining this detecting signal, the key information is transferred in serial, as indicated by $c$. When the trailing edge detecting signal is obtained as indicated by $d$, the key information is transferred again in serial, as indicated by $c$. Exactly the same operations also take place in connection with the other keys of the key matrix 601 (FIG. 7).

The key matrix 501 of the direct station selection key signal transmit portion 101 of FIG. 7 is, for example, a (10×10) key matrix. The clock pulses from the scanning control circuit 506 are counted by the row and column counters 504 and 505, and the rows and columns of the key matrix 501 are scanned with a period, for instance, of 1 ms. pressing a certain key to turn the matrix on causes the output signal from the row counter 504 to be decoded by the decoder 502 so as to provide a row selection pulse, which is applied to the multiplexer 503 on the side of the column through counter 505. When the column is scanned, the row selection pulse is applied as a column information plus to the scanning control circuit 506 from the multiplexer 503.

The scanning control circuit 506 watches whether or not the row selection pulse returns as the column information pulse at each scanning of one cross-point. When the column information pulse can be received as a return pulse, the scanning control circuit 506 applies a set instruction signal to each of the row and column registers 507 and 508 to set therein the count values of the column and row counters 505 and 504, respectively, and then starts the sending control circuit 509.

The sending control circuit 509 performs at first a control of sending the content of the column register 507 in the bit serial manner, and after a predetermined period of time, for example, 20 ms, performs a control of sending the content of the row register 508 in the bit serial manner. During such sending control, a busy signal is applied from the sending control circuit 509 to the scanning control circuit 506 to inhibit sending of the set instruction signal to the column and row registers 507 and 508.

By causing the contents of the column and row registers 507 and 508 to correspond to the tenth digit and the unit digit of the telephone number of each subscriber, the key information from the key matrix 501 is made similar to the dial number of two digits.

Figure 8B:
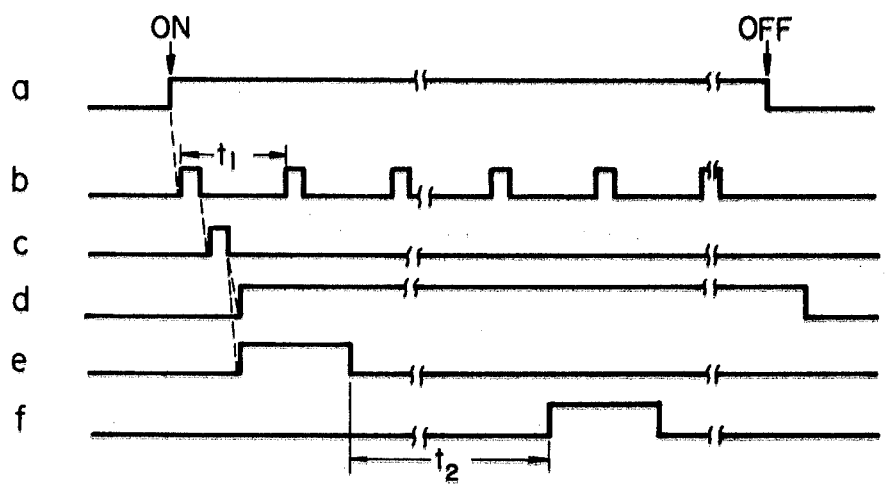

FIG. 8B is a time chart explanatory of the abovesaid operation, $a$ indicating the on and off states of the key, $b$ the commumn information pulse, and t1 the scanning period. When the column information pulse indicated by $b$ is obtained, the set instruction signal indicated by $c$ is provided and the busy signal indicated by $d$ is applied from the sending control circuit 509 to the scanning control circuit 506. The column information is sent in the bit serial manner, as indicated by $e$ and, after a predetermined period $t2$, row information is obtained as indicated by $f$.

FIG. 9 shows in block form the principal parts of the lamp/display signal transmit portion 203 of the position controller and the lamp/display signal receiver and indicative portion 104 of the attendant console. The lamp/display signal transmit portion 203 comprises a random access memory 701 for writing therein the operative state of the exchange, a write register 702, a read register 703, an address counter 704 and a signal distributor circuit 705. A lamp/display signal is read from the random access memory 701 in accordance with the content of the address counter 704, and is applied by the distributor circuit 705 in the bit serial manner to a predetermined one of the attendant consoles through the OR gate 207 and the line driver 206. In this case, heading and ending bits are added to the lamp/display signal.

The lamp/display signal receiver and indicative portion 104 comprises a main-shift register 801, a control circuit 802, AND gates 803 and 804, a plurality of sub-shift registers 805, a lamp/display portion 806, a power switch circuit 807, a gated latch circuit 808, a lamp check circuit 809, (comprising an OR gate 810 and a key 811). The lamp/display signal and the line status signal received by the line receiver 108 are applied to the lamp/display signal receiver and indicative portion 104.

The lamp/display signal from the lamp/display signal transmit portion 203 is applied to the main-shift register 801, and converted by the sub-shift registers 805 into a parallel signal in the same manner as described previously with regard to FIG. 6. The power switch circuit 807 is to turn off the power supply of the lamp/display portion 806 to prevent it from repeatedly turning on and off while the tap outputs from the main-shift register 801 are shifted in serial and set therein.

When the lamp/display signal is set in the main-shift register 801, the output from the AND gate 803 is caused to assume a logical value of "1" by the heading and ending bits, by virtue of which the control circuit 802 is caused to start supplying shift clock pulses to the sub-shift registers 805. At the same time, the power switch circuit 807 is controlled so as to be turned off, and the gate latch circuit 808 is also controlled so as to be turned off.

The lamp/display signal and the line status information signal are transferred in the time-shared manner so that, at the moment of completion of setting the lamp-/display signal in the sub-shift registers 805 after setting it in the main-shift register 801, the AND gate 804 is opened to relay the next line status information signal so as to transfer it to the busy lamp field controller 103.

When the lamp/display signal is set in each sub-shift register 805, the power switch circuit 807 is turned on so as to light the indicative lamps 806, indicating the operative state of the exchange. As long as the state of the exchange remains unchanged, the same content is repeatedly read from the memory 701 by the address counter 704, so that the indicated content of the lamp-/display portion 806 remains unchanged. Even if a temporary transfer error occurs, the correct lamp/display signal is received in the next period, ensuring the provision of a correct lamp indication at all times.

The gated latch circuit 808 is provided for return testing. Test mode information is applied to the gated latch circuit 808 at a predetermined bit position, and when the test mode bit is, for example, "1", a predetermined number of bits (for instance, sixteen bits) are set in the gated latch circuit 808 from a predetermined one of the sub-shift registers 805. The contents of the gated latch circuit 808 are applied to the row and column encoders 602 and 603 of the key matrix 601 of the general-purpose key signal transmit portion 102 (refer to FIG. 7), and the same signal as that obtainable with the actuation of the key matrix 601 is transferred to the position controller 200.

Figure 10:
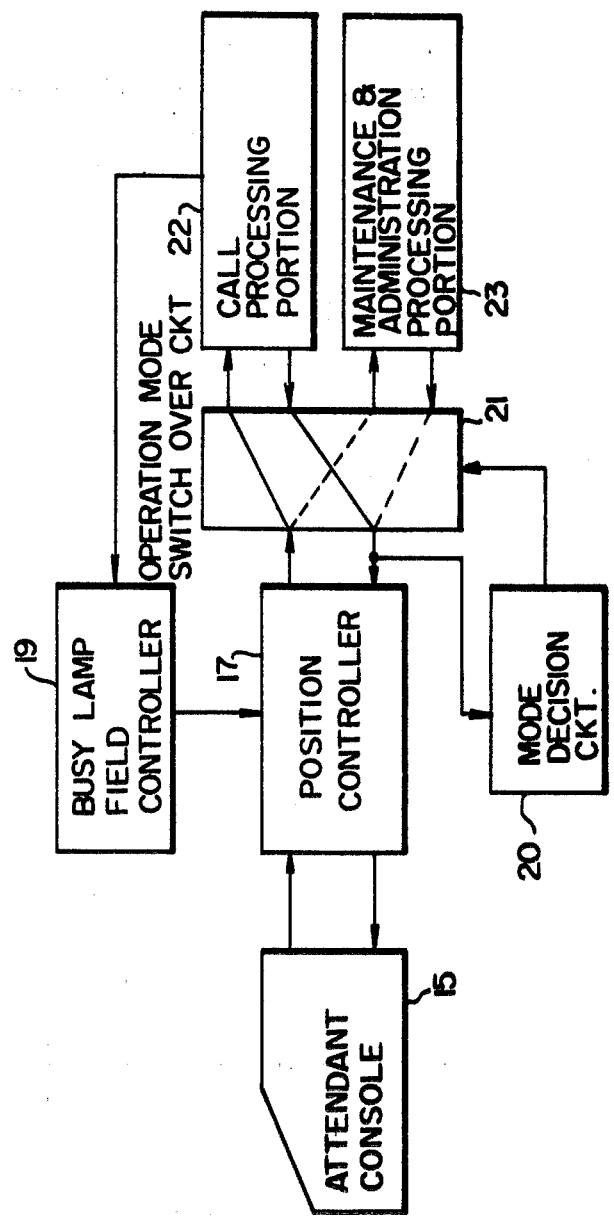
FIG. 10 is a block diagram explanatory of return testing in accordance with the present invention.

Such return testing can be achieved by utilizing an NT (Night Mode) key which is provided, for example, in the attendant console, and which is a key used in the case where the operator leaves the console. For instance, as shown in FIG. 10, a mode decision circuit 20 and an operation mode switchover circuit 21 are provided for the attendant console 15, the position controller 17 and the busy lamp field controller 19, and a call processing portion 22 and a maintenance and administration processing portion 23 are switched by a decision signal from the mode decision circuit 20.

When the aforesaid NT key is turned on, the position controller 17 transfers an NT lamp ON signal to the attendant console 15, and the mode decision circuit 20 decides to establish the test mode with the NT lamp ON signal. Then, by the operation mode switchover circuit 21, the call processing portion 22 is switched over to the maintenance and administration processing portion 23 is connected to the position controller 17. The maintenance and administration processing portion 23 controls sending of the test pattern from the position controller 17. The test pattern is distinguished from usual information by setting the test mode bit at "1" as described above. In the lamp/display signal receiver and indicative portion 104 (FIG. 9), the test mode bit is transferred through the gated latch circuit 808 to the general-purpose key signal transmit portion 102, and further transferred therefrom to the position controller 200 (FIG. 3) or 17 (FIG. 10) as a signal corresponding to the key operation of the key matrix 601 (FIG. 7).

Accordingly, by checking the received key signal for the delivered test pattern in the position controller 17 (FIG. 10), the line status information signal receiving function and the key information transfer function of the attendant console 15 and normality of the transmission line are automatically tested.

For such return testing, the NT key can be utilized, so that there is no need of providing a special key. Further, where the call processing portion 22 is switched over to the maintenance and administration processing portion 23, other tests than the return testing can be achieved. Accordingly, the tests can be carried out by the key operation of the attendant console 15 without providing an input/output device such as a typewriter or the like solely for the maintenance and administration purpose. This provides an economical construction.

Figure 11:
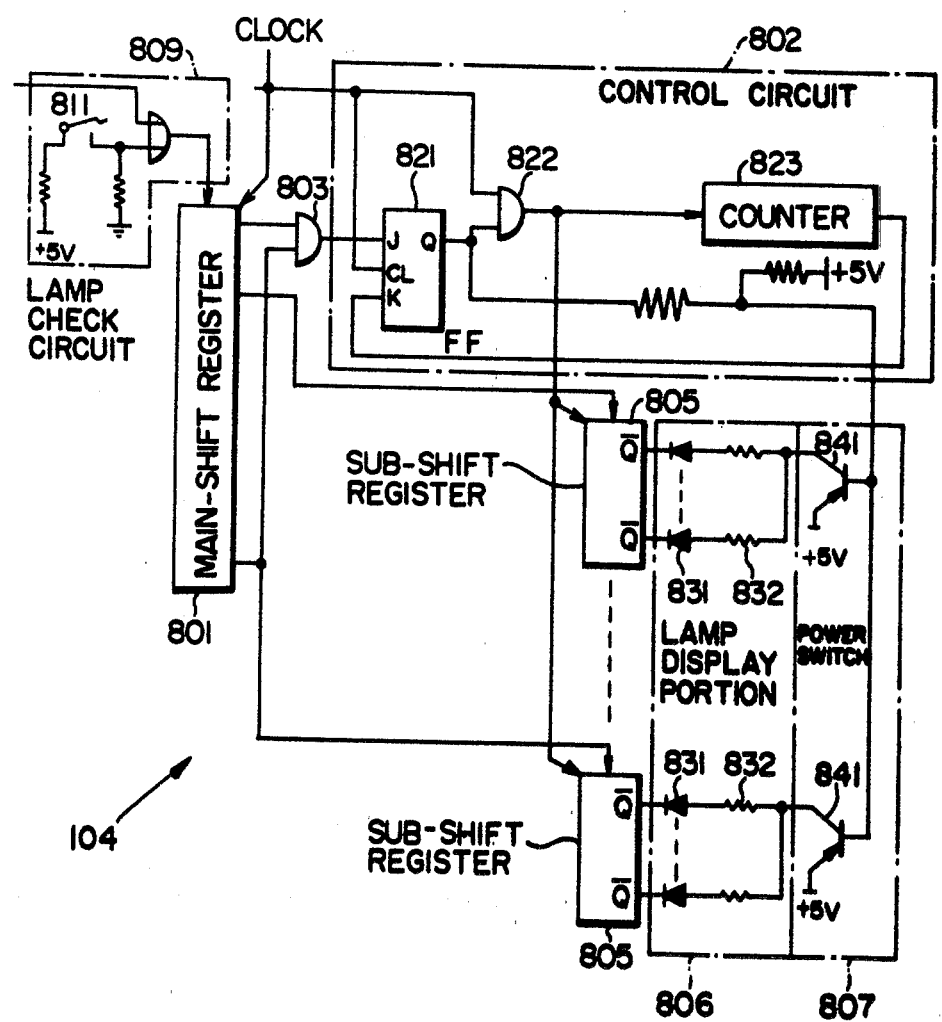
FIG. 11 is a block diagram explanatory of lamp check in accordance with this invention.

FIG. 11 is a block diagram explanatory of checking of the display lamp, illustrating in further detail the principal parts of the lamp/display signal receiver and indicative portion 104. The control circuit 802 comprises a J-K flip-flop 821 and, AND gate 822 and a counter 823. The lamp/display portion 806 comprises lamps or light emission diodes 831 supplied with the parallel output from the sub-shift registers 805, and protective resistors 832. The power switch circuit 807 is formed with transistors 841.

When the heading and ending bits set in the main-shift register 801 are detected by the AND gate 803, the flip-flop 821 of the control circuit 802 is set at the timing of clock pulses applied to the CL-terminal thereof, the Q-terminal output from the flip-flop 821 becomes "1", and clock pulses are supplied to the counter 823 and the sub-shift registers 805 through the AND gate 822. Having counted a required number of clock pulses which are shifted in serial from the main-shift register 801 to the sub-shift registers 805 and set therein, the counter 823 overflows and applies an overflow signal to a K-terminal of the flip-flop 821 to reset it.

Since the Q-terminal output from the flip-flop 821 is applied to the bases of the pnp transistors 841 of the power switch circuit 807, the power switch circuit 807 is held in the off state while the flip-flop 821 is set, that is, while the clock pulses are shifted in serial to the sub-shift registers 805.

The operations such as described above are repeated and the light emission diodes 831 of the lamp/display portion 806 are lighted in accordance with the lamp display signal.

During lamp checking, a signal "1" is continuously applied to the main-shift register 801 by turning on a key 811 of a lamp check circuit 809. Consequently, the flip-flop 821 is reset only when the counter 823 produces the overflow signal, and is immediately set by the next clock pulse. That is, the flip-flop 821 is reset only for the period of one clock pulse, and the resetting period is the counting period of the counter 823.

For example, if the counter 823 is a 4 bit counter, the light emission diodes 831 are lighted dark with a duty of 1/16. Dark lighting of all of the light emission diodes 831 indicates that the operation is normal, but if one or more of the light emission diodes are not lighted dark, it is known that a malfunctioning points exists somewhere in the system. The decision is given as in the following table in which the light emission diodes 831, the control circuit 802, the sub-shift register 805 and the power switch circuit 807 are identified as LED, CTL, SSR and PSW, respectively.

|  | LED | CTL | SSR | PSW |
| --- | --- | --- | --- | --- |
| All LEDs lighted dark | O | O | O | O |
| All LEDs not lighted, or lighted bright | O | X | O | O |
| One or more LEDs not lighted | X | O | O | O |
| Not lighted dark at the rate |  |  |  |  |

|  | LED | CTL | SSR | PSW |
|---|---|---|---|---|
| of two or more LEDs | O | O | X | O |
| Two or more LEDs not lighted dark at the rate of PWS, or lighted bright | O | O | O | X |

The lamp check takes place independently of a lamp drive control circuit in the prior art. In the present invention, however, as is seen from the above, the lamp check covers the circuits adjacent to the lamp. Further, even during normal call processing, the lamp check can be effected at the attendant console without exerting any influence on the position controller. Moreover, the structure for the lamp check may be a simple one to which a signal indicating lamp lighting can be continuously applied, and which is not related to the number of display lamps. In addition, the malfunctioning point can be assumed from the lighting status, as shown in the above table, and since the dark lighting is decided as the normal status, the power supply is not overloaded although the display lamps are all lighted in the normal state.

In FIG. 6, the light emission diodes 410 are driven directly by the parallel outputs from the sub-shift registers 403 to 409 but, in this invention, bright lighting is decided to indicate the normal operation. The other parts can be checked in accordance with the above table. Also in FIG. 6, the power switch circuit can be added, as shown in FIGS. 9 and 11.

As described above, in the present invention, the key information is transferred in the bit serial manner, and the line status information is transferred in the bit serial manner and in the time-shared manner, so that it is sufficient to provide only three pairs of signal lines, including the clock signal line, between each attendant console and the position controller. Accordingly, the construction of this invention is very simple. Further, when a line accommodated in the exchange is called, the line status informaton of the called line is obtained before the attendant's operation for calling the line. Accordingly, service for the reception of a call is improved.

In the line status information display, the line status information corresponding to the respective telephone numbers is stored in a memory and, at a line status display request, the line status information contained in the higher-order digits of the respective telephone numbers is read out from the memory, and is arranged and transferred in the numerical order of the lower-order digits. There is no need for coordinating the order of the telephone numbers to that of the memory addresses. Accordingly, changing of the number of subscribers or modification of the telephone numbers can also readily be achieved by simply modifying the corresponding part of the memory (by effecting the initial setting again).

Moreover, since it is not necessary to provide indicator elements corresponding to all subscribers, the line status display portion is small and simple, and can be attached to an existing attendant console, too.

Further, the line status information is periodically transferred from the positive controller to the attendant console in the bit serial manner, and in the time-shared manner, so that, even if a temporary bit error occurs, it is corrected by the information transferred in the next period, and return testing and lamp checking can be easily achieved.

Since the key information from the direct station selection key signal transmit portion can be sent in the same form as the pattern of a dial number, the key information can be processed regardless of whether the key information is of a dial operation or a key operation.

The present invention is not limited specifically to the foregoing embodiments and various modifications and variations may be effected without departing from the scope of novel concepts of this invention.

What is claimed is:

1. An attendant console control system connected to a telephone network comprising a plurality of telephones having various statuses, said system comprising:

an attendant console having a plurality of keys operable to enter key information into said attendant console, and an indicative portion for visually displaying status information as to said telephones, said attendant console including means for passing said key information in bit serial form;

a position controller for receiving and passing said key information;

a common control equipment connected to said telephone network and responsive to changes in the status of each of said plurality of telephones for providing corresponding update information; and a busy lamp field controller for maintaining status information as to each of said plurality of telephones, responsive to said update information for updating said status information, and responsive to said key information for providing status display signals for displaying said status information corresponding to said key information;

said position controller including means for providing lamp display information, means for combining said lamp display information and said status display signals from the busy lamp field controller in a time-shared manner to form a combined, time-shared signal, and means for transmitting said combined, time-shared signal to the attendant console in bit serial form.

2. The attendant console control system according to claim 1, wherein said key information includes a line status information request requesting line status information as to a give telephone number of given higher-order digits and given lower-order digits, and said busy lamp field controller includes a memory for storing subscribers' telephone numbers including higher-order digits and lower-order digits and line status information corresponding to each of the telephone numbers, means responsive to said line status information request for reading out the line status information of all said stored telephone numbers having said given higher-order digits, means for arranging said read out line status information in the numerical order of the lower-order digits of the telephone numbers corresponding to said read out line status information, and means for transmitting said numerically arranged read out line status information to the attendant console in the bit serial manner.

3. The attendant console control system according to claim 1, wherein the busy lamp field controller includes a first memory for storing the subscribers' telephone numbers and the line status information corresponding to each of the telephone numbers, means responsive to said line status information request for reading out the line status information of all said stored telephone numbers having said given higher-order digits from the first memory, a second memory, means for using the lower-order digits of all said telephone numbers corresponding to said read out line status information as addresses so as to addressably store said read out line status information in the second memory in the numerical order of the lower-order digits of the telephone numbers, and means for reading said line status information from said second memory in said numerical order of the lower-order digits.

4. The attendant console control system according to claim 1, wherein the attendant console includes means for serial-parallel converting said combined signal transmitted by said position controller in the time-shared, bit serial manner to form a corresponding parallel signal, lamp display portions, and means for driving said lamp display portions in accordance with the parallel signal to provide a display of the status information as to each of said plurality of telephones.

5. The attendant console control system according to claim 1, wherein the attendant console includes a main-shift register having taps, sub-shift registers connected to said taps of the main-shift register every predetermined number of bits, and lamp display portions supplied with parallel outputs from the sub-shift registers, and including means for setting the information transferred in the bit serial manner in the main-shift register so as to provide at each tap corresponding tap information, and means for simultaneously shifting said tap information to corresponding said sub-shift registers, and means for driving the lamp display portions with the parallel outputs from the sub-shift registers to provide a display.

6. The attendant console control system according to claim 5, wherein the attendant console includes a lamp check circuit for providing a lamp lighting signal continuously to the main-shift register, and wherein said parallel outputs from the sub-shift registers connected to the taps of the main-shift register every predetermined bits are applied to the lamp display portions for lamp checking.

7. The attendant console control system according to claim 5, wherein there is provided a power switch circuit for turning off a power source of the lamp display portions while the tap information from the main-shift register is being set in the sub-shift registers.

8. The attendant console control system according to claim 1, wherein the attendant console includes a general-purpose key signal transmit portion and a direct station selection key signal transmit portion, the general-purpose key signal transmit portion being responsive to operator actuation of selected ones of said keys to a turned-on condition for sending out key information in the bit serial manner, and the direct station selection key signal transmit portion detecting the turned-on key and responsive thereto for sending out information identifying said key in the bit serial manner as said key information.

9. The attendant console control system according to claim 8, wherein the general-purpose key signal transmit portion and the direct station selection key signal transmit portion each include a key matrix.

10. The attendant console control system according to claim 8, wherein the general-purpose key signal transmit portion and the direct station selection key signal transmit portion each include means for sending out said key information in the timeshared manner.

11. The attendant console control system according to claim 8, wherein the general-purpose key signal transmit portion includes means for providing a key on-off information bit, and means responsive to the key being turned on and off for selectively setting the key on-off information bit to correspond to the on and off states of the key, respectively.

12. The attendant console control system according to claim 9, wherein each of said plurality of telephones in said network has a corresponding telephone number having at least a tens and a units digit, and the key matrix of said direct station selection key signal transmit portion includes at least a row and column corresponding to the tens and units digit of said telephone numbers, and wherein the direct station selection key signal transmit portion includes means for scanning the key matrix to read it out, and means for sending out the row and column of the key matrix corresponding to the tens and the units digit, respectively, and for sending out the row information and column information of the turned-on key of the key matrix in the time-shared manner.

13. The attendant console control system according to claim 1, wherein said key information passsed by said position controller is provided to said common control equipment, said common control equipment including means for receiving said key information and passing said key information to said busy lamp field controller.

14. An attendant console control system connected to a telephone network comprising a plurality of telephones having various statuses, said system comprising;
at least one attendant console having input means operable to enter key information indicating a given one of said plurality of telephones, and an indicative means for visually displaying status information as to said telephones;
first means connected to said telephone network, responsive to changes in the status of each of said plurality of telephones for updating said status information, and responsive to said key information for providing status display signals for displaying said status information corresponding to said given one of said plurality of telephones as indicated by said key information;
second means responsive to said key information for providing lamp display information corresponding thereto; and
third means for combining said lamp display information with said status display signals in a time-shared manner to form a combined, time-shared signal for transmission to the at least one attendant console in bit serial form.

15. The attendant console control system according to claim 14, said at least one attendant console comprising a plurality of attendant consoles, said system further including means for transmitting said combined, time-shared signal to each of said plurality of attendant consoles on a time-shared basis.

16. The attendant console control system according to claim 14, wherein said first means comprises a busy lamp field controller.

17. The attendant console control system according to claim 16, wherein said key information includes a line status information request requesting line status information as to a given telephone number of given higher-order digits and given lower-order digits, and said busy lamp field controller includes a memory for storing subscribers' telephone numbers including higher-order digits and lower-order digits and line status information corresponding to each of the telephone numbers, means responsive to said line status information request for reading out the line status information of all said stored telephone numbers having said given higher-order digits, means for arranging said read out line status information in the numerical order of the lower-order digits of the telephone numbers corresponding to said read out line status information, and means for transmitting said numerically arranged read out line status information to the attendant console in the bit serial manner.

18. The attendant console control system according to claim 16, wherein the busy lamp field controller includes a first memory for storing the subscribers' telephone numbers and the line status information corresponding to each of the telephone numbers, means responsive to said line status information request for reading out the line status information of all said stored telephone numbers having said given higher-order digits from the first memory, a second memory, means for using the lower-order digits of all said telephone numbers corresponding to said read out line status information as addresses so as to addressably store said read out line status information in the second memory in the numerical order of the lower-order digits of the telephone numbers, and means for reading said line status information from said second memory in said numerical order of the lower-order digits.

19. The attendant console control system according to claim 14, wherein said first means comprises a common control equipment connected to said telephone network and responsive to said changes in status of each of said plurality of telephones for providing corresponding update information for updating said status information.

20. The attendant console control system according to claim 14, wherein said at least one attendant console includes means for serial-parallel converting said combined, time-shared signal to form a corresponding parallel signal, lamp display portions, and means for driving said lamp display portions in accordance with the parallel signal to provide a display of the status information as to said telephones.

21. The attendant console control system according to claim 14, wherein said at least one attendant console includes a main-shift register having taps, sub-shift registers connected to said taps of the main-shift register every predetermined number of bits, and lamp display portions supplied with parallel outputs from the sub-shift registers, and including means for setting the information transferred in the bit serial manner in the main-shift register so as to provide at each tap corresponding tap information, and means for simultaneously shifting said tap information to corresponding said sub-shift registers, and means for driving the lamp display portions with the parallel outputs from the sub-shift registers to provide a display.

22. The attendant console control system according to claim 21, wherein said at least one attendant console includes a lamp check circuit for providing a lamp lighting signal continuously to the main-shift register, and wherein said parallel outputs from the sub-shift registers connected to the taps of the main-shift register every predetermined bits are applied to the lamp display portions for lamp checking.

23. The attendant console control system according to claim 21, wherein there is provided a power switch circuit for turning off a power source of the lamp display portions while the tap information from the main-shift register is being set in the sub-shift registers.

24. The attendant console control system according to claim 14, wherein said at least one attendant console includes a general-purpose key signal transmit portion and a direct station selection key signal transmit portion, the general-purpose key signal transmit portion being responsive to operator actuation of selected ones of said keys to a turned-on condition for sending out key information in the bit serial manner, and the direct station selection key signal transmit portion detecting the turned-on key and responsive thereto for sending out information identifying said key in the bit serial manner as said key information.

25. The attendant console control system according to claim 24, wherein the general-purpose key signal transmit portion and the direct station selection key signal transmit portion each include a key matrix.

26. The attendant console control system according to claim 25, wherein each of said plurality of telephones in said network has a corresponding telephone number having at least a tens and a units digit, and the key matrix of said direct station selection key signal transmit portion includes at least a row and column corresponding to the tens and units digit of said telephone numbers, and wherein the direct station selection key signal transmit portion includes means for scanning the key matrix to read it out, and means for sending out the row and column of the key matrix corresponding to the tens and the units digit, respectively, and for sending out the row information and column information of the turned-on key of the key matrix in the time-shared manner.

27. The attendant console control system according to claim 24, wherein the general-purpose key signal transmit portion and the direct station selection key signal transmit portion each include means for sending out said key information in the time-shared manner.

28. The attendant console control system according to claim 24, wherein the general-purpose key signal transmit portion includes means for providing a key on-off information bit, and means responsive to the key being turned on and off for selectively setting the key on-off information bit to correspond to the on and off states of the key, respectively.

* * * * *

UNITED STATES PATENT AND TRADEMARK OFFICE
CERTIFICATE OF CORRECTION

PATENT NO. : 4,103,113
DATED     : July 25, 1978
INVENTOR(S) : Kazuhiro Sato et al It is certified that error appears in the above–identified patent and that said Letters Patent are hereby corrected as shown below:

```
Column 1, line 9,  "telephon" should be --telephone--.
Column 1, line 25, "differes" should be --differs--.
Column 2, line 17, "numer" should be --number--.
Column 2, line 46, "FIG." should be --FIGS.--.
Column 2, line 64, "distanct" should be --distant--.
Column 3, line 24, delete "a" (second occurrence).
Column 3, line 52, "310." should be --310,--.
Column 5, line 26, "their" should be --Their--.
Column 6, line 29, "is" (first occurrence) should be --it--.
Column 7, line 50, "pressing" should be --Pressing--.
Column 8, line 16, "commumn" should be --column--.
Column 10, line 57, "points" should be --point--.
Column 12, line 46, "give" should be --given--.
```

Signed and Sealed this

Tenth Day of April 1979

[SEAL]

Attest:

RUTH C. MASON
*Attesting Officer*

DONALD W. BANNER
*Commissioner of Patents and Trademarks*